United States Patent
Maehara et al.

(10) Patent No.: US 8,682,603 B2
(45) Date of Patent: Mar. 25, 2014

(54) SUBSTATION INSTRUMENT CONTROL SYSTEM

(75) Inventors: Hiroyuki Maehara, Tokyo (JP); Tomonori Nishida, Kanagawa-ken (JP); Shigeki Katayama, Tokyo (JP); Yukihiko Maede, Tokyo (JP); Minoru Saito, Kanagawa-ken (JP); Wataru Yamamori, Tokyo (JP); Jun Takehara, Tokyo (JP); Takaya Shono, Tokyo (JP)

(73) Assignee: Toshiba Corporation, Tokyo (JP)

(*) Notice: Subject to any disclaimer, the term of this patent is extended or adjusted under 35 U.S.C. 154(b) by 326 days.

(21) Appl. No.: 13/158,162

(22) Filed: Jun. 10, 2011

(65) Prior Publication Data

US 2012/0143535 A1 Jun. 7, 2012

(30) Foreign Application Priority Data

Jun. 23, 2010 (JP) ................ P2010-142716

(51) Int. Cl.
*G06F 19/00* (2011.01)

(52) U.S. Cl.
USPC .......... 702/60; 702/62; 702/64; 702/188; 700/292; 700/295; 700/286; 361/60; 361/62; 361/71

(58) Field of Classification Search
USPC ......... 702/60, 62, 57, 64, 58, 65, 72, 79, 177, 702/187, 188, 189; 700/292, 295, 2, 4, 297, 700/79, 286, 293; 361/60, 62, 71; 324/127
See application file for complete search history.

(56) References Cited

U.S. PATENT DOCUMENTS

| | | | | |
|---|---|---|---|---|
| 5,995,911 | A * | 11/1999 | Hart | 702/64 |
| 6,285,917 | B1 * | 9/2001 | Sekiguchi et al. | 700/239 |
| 6,845,301 | B2 * | 1/2005 | Hamamatsu et al. | 700/292 |
| 6,954,704 | B2 * | 10/2005 | Minami et al. | 702/62 |
| 7,616,419 | B2 * | 11/2009 | Koyama et al. | 361/71 |
| 7,630,863 | B2 * | 12/2009 | Zweigle et al. | 702/188 |
| 7,902,813 | B2 * | 3/2011 | Kojovic et al. | 324/127 |
| 2002/0012805 | A1 * | 1/2002 | Mogi et al. | 428/469 |
| 2002/0116092 | A1 * | 8/2002 | Hamamatsu et al. | 700/295 |
| 2004/0027750 | A1 * | 2/2004 | Minami et al. | 361/62 |
| 2008/0071482 | A1 * | 3/2008 | Zweigle et al. | 702/62 |
| 2008/0123234 | A1 * | 5/2008 | Koyama et al. | 361/71 |
| 2009/0216479 | A1 * | 8/2009 | Kaufmann | 702/109 |
| 2010/0241902 | A1 * | 9/2010 | Gilbertson et al. | 714/33 |
| 2012/0050937 | A1 * | 3/2012 | Saito et al. | 361/187 |

FOREIGN PATENT DOCUMENTS

JP H14-315233 A 10/2002

* cited by examiner

*Primary Examiner* — Carol S Tsai
(74) *Attorney, Agent, or Firm* — Baker Botts L.L.P.

(57) ABSTRACT

A substation instrument control system is disclosed. The substation instrument control system includes a plurality of transformers that generate a plurality of waveform signals representing electric properties of a substation instrument main body. A merging unit is communicatively coupled to the plurality of transformers and includes a signal processing unit and a control unit. The signal processing unit receives the plurality of waveform signals from the plurality of transformers and converts the plurality of waveform signals to a digital signal. The control unit controls operation of the signal processing unit using a setting data. An intelligent electronic device is communicatively coupled to the merging unit and receives the digital signal from the merging unit.

17 Claims, 4 Drawing Sheets

```xml
<?xml version="1.0" ?>
<IED Ref="IED-NAME" Type="ABC123">
  <Sampling>
    <RatedFrequency="50">
    <SamplesPerCycle="80">
  </Sampling>
  <Filter>
    <Analog>
      <CutOffFrequency="500">
    </Analog>
    <Digital>
      <FunctionNumber="1">
    </Digital>
  </Filter>
  <Channels>
    <Channel Ref="1" Type="Current" Unit="A" RatedValue="5" FullScale="163.84"/>
    <Channel Ref="2" Type="Current" Unit="A" RatedValue="5" FullScale="163.84"/>
    <Channel Ref="3" Type="Current" Unit="A" RatedValue="5" FullScale="163.84"/>
    <Channel Ref="4" Type="Current" Unit="A" RatedValue="5" FullScale="10.24"/>
    <Channel Ref="5" Type="Voltage" Unit="V" RatedValue="63.5" FullScale="163.84"/>
    <Channel Ref="6" Type="Voltage" Unit="V" RatedValue="63.5" FullScale="163.84"/>
    <Channel Ref="7" Type="Voltage" Unit="V" RatedValue="63.5" FullScale="163.84"/>
    <Channel Ref="8" Type="Voltage" Unit="V" RatedValue="190" FullScale="245.76"/>
  </Channels>
</IED>
```

FIG. 2

SUBSTATION INSTRUMENT CONTROL SYSTEM

The application is based upon and claims the benefit of priority from Japanese Patent Application No. P2010142716, filed on Jun. 23, 2010, the entire contents of which are incorporated herein by reference.

TECHNICAL FIELD

The present disclosure relates generally to a substation instrument control system, and more particularly to a substation instrument control system that digitizes pieces of data extracted from a substation instrument, and transmits the digitized pieces of data through a process bus.

BACKGROUND

In a conventional substation instrument control system, after a transformer (an instrument current transformer ("CT") or an instrument voltage transformer ("VT")) attached to a substation instrument main body converts a current or a voltage of a main circuit of a substation instrument into a current or a voltage suitable for measurement, a protection control system measures a waveform (hereinafter referred to as waveform signal) of the current or voltage. However, in conventional substation instrument control systems, it is necessary to connect an electric cable from the substation instrument main body to the protection control system for each waveform signal.

Another approach is to apply a process bus to the substation instrument control system. In the substation instrument control system, a merging unit is disposed near the substation instrument and the waveform signals input from the plural transformers are temporarily input to the merging unit. The merging unit digitizes and merges the waveform signals from the transformers, and transmits the digitized and merged waveform signal to a high-level protection control system (Intelligent Electronic Device ("IED")) through a serial communication called process bus. Digitizing and transmitting the waveform signals through the process bus may eliminate the electric cables, reduce a secondary-side load of the transformer, and standardize the protection control system.

The serial communication through the process bus of the substation instrument control system may be standardized to facilitate communication between the merging unit and the IED, even in instances when the merging unit and the IED are made by different manufacturers. However, the type of substation instrument used (e.g., voltage transformer or power transmission line), the type of IED used (e.g., a protection device or a control system), the disposition of the substation instrument or the IED, and required performance/characteristics of the substation instrument or the IED may depend on the substation. Accordingly, the substation characteristics may affect the setting of the merging unit.

The setting of the merging unit may include the sampling rate of the waveform signal output from the transformer, the maximum value (full scale) of the waveform signal that can be input, and the filter characteristic of an analog Low-Pass Filter ("LPF"), which is necessary to prevent aliasing generated in digitally converting the waveform signal.

It is not practical to achieve standardization by preparing merging unit hardware for the numerous combinations of characteristics, as doing so would require a significant number of different merging unit types. Moreover, the disposition and configuration of the substation instruments typically varies by expansion. It is, therefore, desirable to be able to easily change the merging unit settings onsite.

SUMMARY OF THE INVENTION

In view of the foregoing, an object of the present disclosure is to provide a substation instrument control system that can change a setting through a process bus.

In one exemplary embodiment, the present disclosure is directed to a substation instrument control system comprising: a plurality of transformers; wherein the plurality of transformers generate a plurality of waveform signals representing electric properties of a substation instrument main body; a merging unit communicatively coupled to the plurality of transformers comprising a signal processing unit and a control unit; wherein the signal processing unit receives the plurality of waveform signals from the plurality of transformers; wherein the signal processing unit converts the plurality of waveform signals to a digital signal; wherein the control unit controls operation of the signal processing unit using a setting data; and an intelligent electronic device communicatively coupled to the merging unit; wherein the intelligent electronic device receives the digital signal from the merging unit.

In another exemplary embodiment, the present disclosure is directed to a substation instrument control system comprising: a first transformer, wherein the first transformer comprises: a first filter for filtering a first waveform signal reflecting an electric characteristic of a substation instrument main body; a first converter for converting the first waveform signal to a first digital signal, a first communication port, wherein the communication port transmits the first digital signal and receives a first setting data; wherein a filter characteristic of the first filter is set by the first setting data; and a merging unit; wherein the merging unit receives the first digital signal from the first communication port.

In yet another exemplary embodiment, the present disclosure is directed to a method for controlling a substation instrument main body comprising the steps of obtaining a plurality of waveform signals reflecting an electric property of a substation instrument main body; wherein a plurality of transformers obtain the plurality of waveform signals; transmitting the plurality of waveform signals to a merging unit; wherein the merging unit comprises a signal processing unit, a control unit and a communication port; converting the plurality of waveform signals to a digital signal using the signal processing unit; directing the digital signal to an intelligent electronic device through the communication port; inputting a setting data of at least one of the plurality of transformers and the merging unit; directing the setting data of at least one of the plurality of transformers and the merging unit to the communication port; adjusting a characteristic of at least one of the signal processing unit and the plurality of transformers using the setting data.

The features and advantages of the present disclosure will be readily apparent to those skilled in the art upon a reading of the description of exemplary embodiments, which follows.

BRIEF DESCRIPTION OF THE DRAWINGS

FIG. 2 illustrates an example of setting data of the substation instrument control system of FIG. 1;

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF THE EMBODIMENTS

Figure 1:
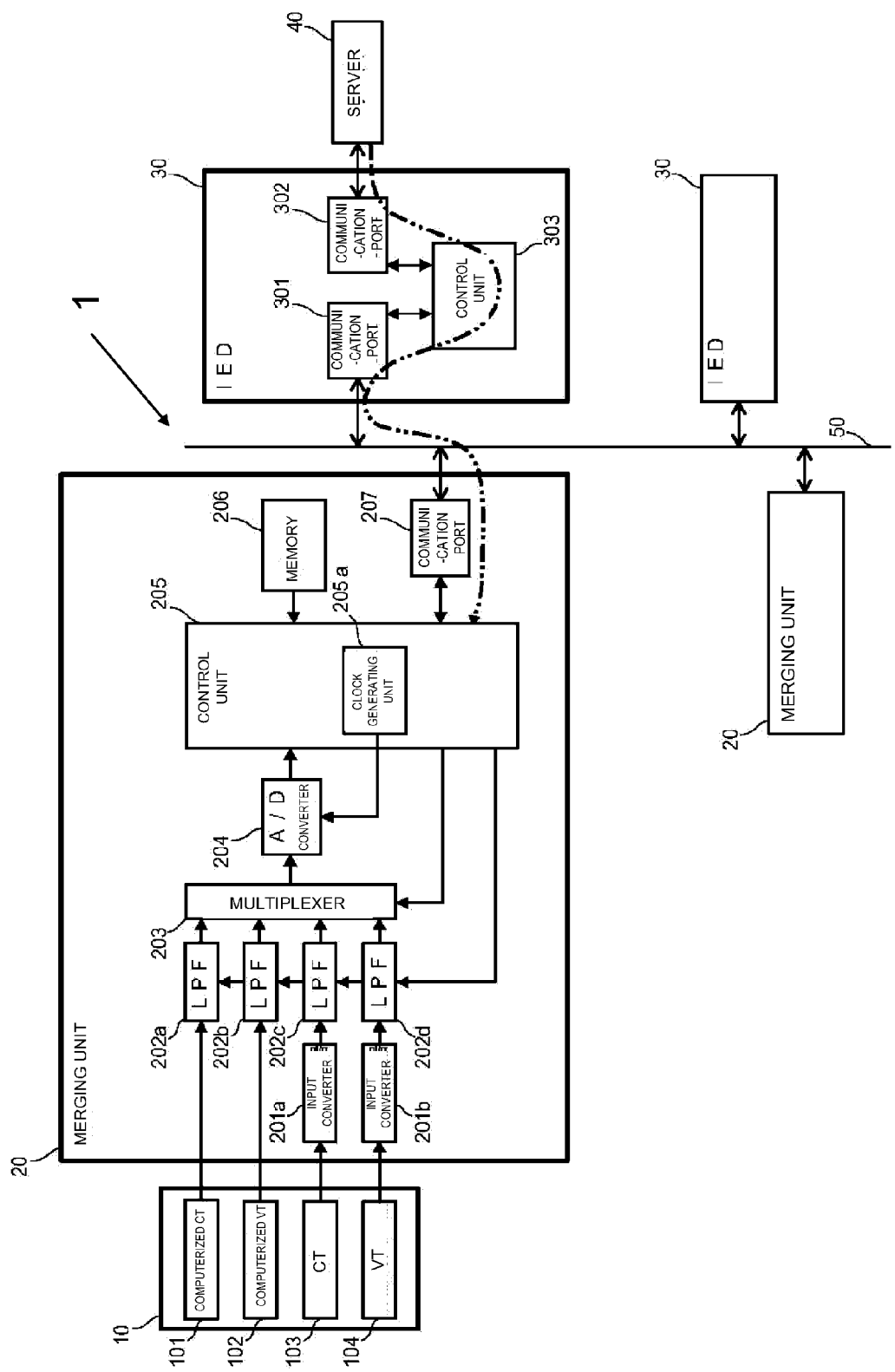
FIG. 1 illustrates a configuration of a substation instrument control system in accordance with a first embodiment of the present disclosure.

FIG. 1 illustrates an exemplary configuration of a substation instrument control system 1 according to an embodiment of the present disclosure. The substation instrument control system 1 may include one or more transformers 10, one or more merging units 20, an IED 30, a server 40, and a process bus 50. The plural merging units 20 and the IED 30 may be connected through the process bus 50. In FIG. 1, an alternate long and two short dashes line indicates a flow of setting data.

The transformer 10 may be attached to a substation instrument main body (not illustrated) and may measure electric properties of the main circuit of the substation instrument main body. Specifically, the transformer 10 extracts an AC current passed through a main circuit of the substation instrument main body and converts the AC current into a current and a voltage suitable for measurement. The transformer 10 may include one or more of a computerized current transformer (computerized CT) 101, a computerized instrument voltage transformer (computerized VT) 102, a conventional current transformer (CT) 103, and a conventional instrument voltage transformer (VT) 104. Although not illustrated in FIG. 1, plural voltages or currents can be input to the computerized CT 101, computerized VT 102, CT 103, and VT 104 of the transformer 10 in order to facilitate a three-phase alternating current.

In one exemplary embodiment, the computerized CT 101 may include a single Rogowski coil, a device in which the Rogowski coil and an electronic circuit are combined, and an optical CT in which an optical element such as a Faraday element is utilized. In one exemplary embodiment, the computerized VT 102 may include a single voltage divider, a device in which the voltage divider and an electronic circuit are combined, and an optical VT in which an optical element such as a Pockels element is utilized. In one exemplary embodiment, the CT 103 and the CV 104 may include a device in which a coil is wound around an iron core to transform the current and voltage by electromagnetic induction.

The merging unit 20 may be disposed near the transformer 10. Current or voltage waveforms (hereinafter referred to as waveform signals) are input to the merging unit 20 from one or more transformers disposed in the substation instrument main body. The merging unit 20 merges the plural waveform signals and transmits the merged waveform signal to the IED 30 through the process bus 50. In one exemplary embodiment, the signal waveform input from the transformer 10 may be an analog signal.

The merging unit 20 may include a signal processing unit with input converters 201a and 201b, LPFs (Low-Pass Filter) 202a to 202d, a multiplexer (MUX) 203, and an A/D (Analog/Digital) converter 204. The merging unit 20 may further include a control unit 205, a memory 206, and a communication port 207.

The input converter 201a converts a current signal (for example, a large current such as a rated current of 5A or 1A for the electronic circuit) from the CT 103 into a current level (for example, several milliampares) that is manageable by the electronic circuit, and inputs the converted current signal to the LPF 202c. Similarly, the input converter 201b converts a voltage signal (for example, a high voltage such as a rated voltage of 63.5 V for the electronic circuit) from the VT 104 into a voltage level (for example, several volts) that is manageable by the electronic circuit, and inputs the converted voltage signal to the LPF 202d. The waveform signals from the computerized CT 101 and the computerized VT 102 are directly input to the LPFs 202a and 202b.

The LPFs 202a to 202d are analog low-pass filters that are provided in order to prevent the aliasing when the subsequent A/D converter 204 digitally converts the waveform signal input from the transformer 10. The LPFs 202a to 202d pass low-frequency bands of the waveform signals input from the computerized CT 101, computerized VT 102, CT 103, and CV 104. Each of the LPFs 202a to 202d may include a programmable amplifier or an analog Field Programmable Gate Array ("FPGA") that may change the filter gain and filter characteristic.

Outputs of the LPFs 202a to 202d are input to the multiplexer 203. Based on a timing signal input from the control unit 205, the multiplexer 203 sequentially inputs the waveform signals input from the LPFs 202a to 202d while switching the waveform signals. The A/D converter 204 converts the analog waveform signal input from the multiplexer 203 into the digital waveform signal. The A/D converter 204 may then input the digitally-converted signal to the control unit 205.

The control unit 205 includes a clock generating circuit 205a that generates a clock frequency. The control unit 205 provides an instruction of switching timing to the multiplexer 203 based on the clock frequency of the clock generating circuit 205a. The control unit 205 provides an instruction of sampling timing of the waveform signal in the A/D converter 204 based on the clock frequency of the clock generating circuit 205a.

The control unit 205 may change gains and filter characteristics (cut-off frequencies) of the LPFs 202a to 202d based on setting data transmitted from the server 40. The control unit 205 may also change the clock frequency of the clock generating circuit 205a based on the setting data transmitted from the server 40. The control unit 205 transmits the digitally-converted signal input from the A/D converter 204 to the IED 30 through the communication port 207 and the process bus 50.

The memory 206 may store data such as an operating code and/or a program. The control unit of the merging unit 20 reads the data stored in the memory 206, thereby exerting a function of the control unit 205. The communication port 207 transmits the input digital signal to the IED 30 through the process bus 50. The clock generating circuit 205a generates the clock signal and inputs the clock signal to the control unit 205.

The length of the electric cable from the transformer 10 to the merging unit 20 can be shortened because the merging unit 20 is disposed near the transformer 10. Accordingly, in a secondary-side load of the transformer 10, a load caused by impedance of the electric cable can be reduced. This enables an outer shape and a mass of a transformer main body to be decreased without changing an error specification of the transformer, thereby contributing to rationalization of the substation instrument control system.

The IED 30 may monitor the state of the substation instrument main body based on the digital signal transmitted from the merging unit 20. The IED 30 may then control the substation instrument main body according to the state of the substation instrument main body.

The IED 30 may include a first communication port 301, a second communication port 302, and a control unit 303. The first communication port 301 receives the digital signal transmitted from the merging unit 20 through the process bus 50. The first communication port 301 may also transmit the setting data, received by the second communication port 302, to the merging unit 20 through the process bus 50. The setting data is described later in detail with reference to FIG. 2.

The second communication port 302 receives setting data that may be transmitted from the server 40. The server 40 transmits the setting data to the IED 30 in order to change the settings of the LPFs 202a-202d of the merging unit 20.

The control unit 303 transfers the digital signal and the setting data between the first communication port 301 and the second communication port 302. The function of the control unit 303 is realized by reading the data stored in the memory 206.

FIG. 2 illustrates an example of the setting data. The setting data may be described in the XML form. The setting data may include one or more of the following pieces of information: the clock frequency of the clock generating circuit 205a; the gains and filter characteristics (cut-off frequency) of the LPFs 202a to 202d; the number of sampling times per one cycle of the A/D converter 204; a function number used to identify one of digital filters prepared in the merging unit; an input type (current/voltage), a rated value, and the full scale, which are allocated to input numbers 1 to 8.

The setting data may be disclosed to manufacturers of the merging unit and IED, and interoperability of the setting data can be ensured between different manufacturers.

The control unit 205 may change the clock frequency of the clock generating circuit 205a based on the setting data illustrated in FIG. 2. As a result, the switching timing of the multiplexer 203 and the sampling timing of the A/D converter 204 may be altered. The control unit 205 changes the gains and filter characteristics (cut-off frequencies) of the LPFs 202a-202d based on the setting data illustrated in FIG. 2.

As described above, in the substation instrument control system 1 of the first embodiment, the server 40 transmits the setting data to the merging unit 20 through the process bus 50, which allows the setting of the merging unit 20 to be easily changed. Accordingly, the standardization and operation of the substation instrument control system 1 may be achieved.

Figure 3:
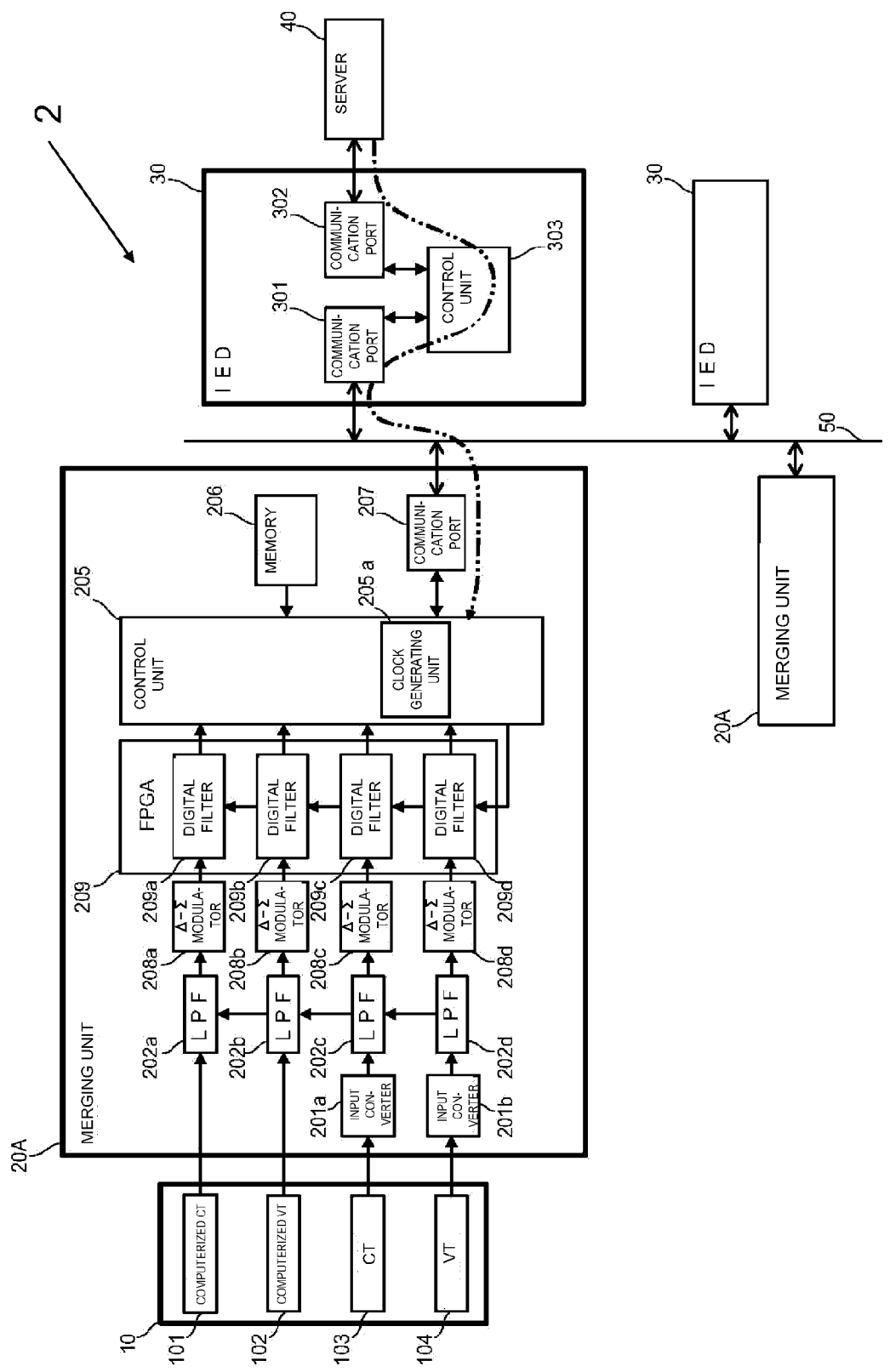
FIG. 3 illustrates a configuration of a substation instrument control system in accordance with a second embodiment of the present disclosure.

FIG. 3 illustrates a configuration of a substation instrument control system 2 according to a second embodiment of the disclosure. The substation instrument control system 2 of the second embodiment includes the transformer 10, a merging unit 20A, the IED 30, the server 40, and the process bus 50. Similarly to the substation instrument control system 1, the substation instrument control system 2 has a configuration in which the plural merging units 20A and the IED 30 may be connected through the process bus 50. Each configuration of the substation instrument control system 2 will be described below. The same configuration as that of FIG. 1 is designated by the same numeral, and the overlapping description will not be repeated.

The merging unit 20A of the substation instrument control system 2 includes the input converters 201a and 201b, the LPFs 202a to 202d, modulators 208a to 208d, DFs ("Digital Filters") 209a to 209d, the control unit 205, the memory 206, and the communication port 207.

The LPFs 202a to 202d are primary filters. The LPFs 202a to 202d may pass the low-frequency bands of the waveform signals input from the computerized CT 101, computerized VT 102, CT 103, and CV 104. The Δ-Σ modulators 208a to 208d convert the analog waveform signals input from the LPFs 202a to 202d into the digital signals, respectively.

The DFs 209a to 209d substantially remove quantization noises of the digital signals input from the A-E modulators 208a to 208d, respectively. The DFs 209a to 209d may include digital FPGAs. The DFs 209a to 209d include different kinds of digital filters, and the DFs 209a to 209d can change the digital filters in response to the instruction from the control unit 205. The DFs 209a to 209d may include decimation filters. The DFs 209a to 209d may be realized by any suitable methods acceptable for the digital FPGA.

The control unit 205 may change the kinds of the digital filters used in the DFs 209a to 209d based on the setting data transmitted from the server 40.

As described above, in the substation instrument control system 2, the server 40 transmits the setting data to the merging unit 20A through the process bus 50, which allows the settings (the types of the digital filters) of the DFs 209a to 209d of the merging unit 20A to be easily changed. Other aspects of instrument control system 2 are similar to instrument control system 1.

Figure 4:
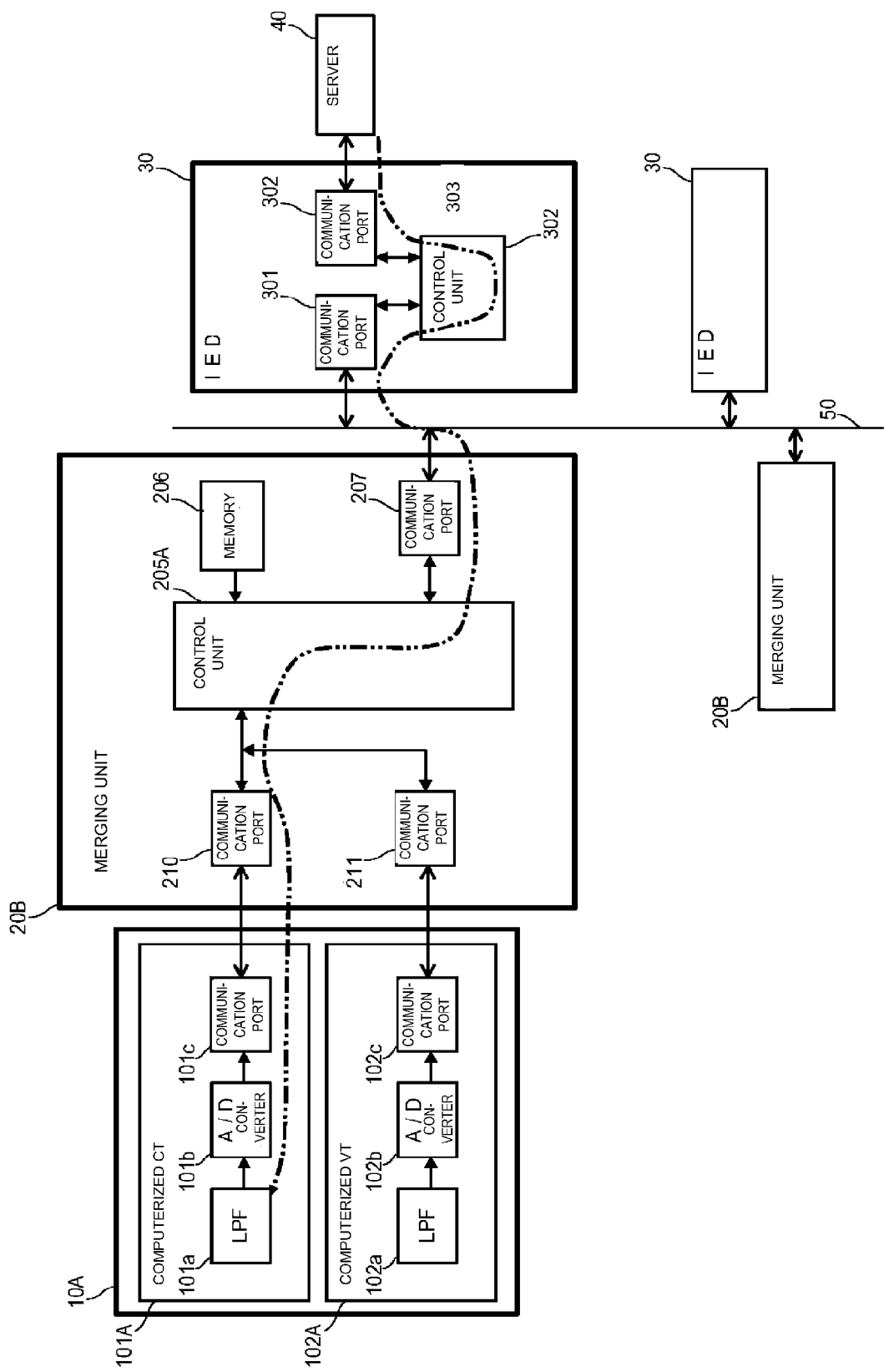
FIG. 4 illustrates a configuration of a substation instrument control system in accordance with a third embodiment of the present disclosure.

FIG. 4 illustrates a configuration of a substation instrument control system 3 according to another exemplary embodiment of the present disclosure. The substation instrument control system 3 may include a transformer 10A, a merging unit 20B, the IED 30, the server 40, and the process bus 50. Similarly to the substation instrument control system 1, the substation instrument control system 3 has a configuration in which the plural merging units 20B and the IED 30 are connected through the process bus 50. Each configuration of the substation instrument control system 3 will be described below. The same configuration as that of FIG. 1 is designated by the same numeral, and the overlapping description will not be repeated.

The transformer 10A is attached to the substation instrument main body (not illustrated). The transformer 10A converts the large current and high voltage of the substation instrument main body into the current and voltage suitable for the measurement. Examples of the transformer 10A include a computerized CT 101A and a computerized VT 102A. Although not illustrated in FIG. 4, plural voltages or currents can be input to the computerized CT 101A and computerized VT 102A of the transformer 10A in order to deal with the three-phase alternating current.

The computerized CT 101A may include an LPF 101a, an A/D converter 101b, and a communication port 101c. The LPF 101a is an analog low-pass filter that is provided in order to prevent aliasing when the subsequent A/D converter 101b digitally converts the waveform signal. The LPF 101a passes the low-frequency band of the waveform signal. The LPF 101a is formed by a programmable amplifier or an analog FPGA, and can change the gain and the filter characteristic. The gain and the filter characteristic are changed based on the setting data that is transmitted from the server 40 through the process bus 50 and the merging unit 20B.

The A/D converter 101b converts the analog waveform signal input from the LPF 101a into the digital signal. The communication port 101c transmits the digitally-converted signal to the merging unit 20B.

The computerized VT 102A includes an LPF 102a, an A/D converter 102b, and a communication port 102c. The LPF 102a, the A/D converter 102b, and the communication port 102c correspond to the LPF 101a, the A/D converter 101b, and the communication port 101c, respectively, and have the same configurations. Therefore, overlapping description will not be repeated.

The merging unit 20B includes a control unit 205, a memory 206, and communication ports 207, 210, and 211. The communication port 210 conducts communication with the communication port 101c of the computerized CT 101A. Specifically, the communication port 210 receives the digital signal transmitted from the communication port 101c, and transmits the setting data, transmitted from the server 40 through the process bus 50, to the communication port 101c.

The communication port 211 conducts communication with the communication port 102c of the computerized CT 102A. Specifically, the communication port 211 receives the digital signal transmitted from the communication port 102c, and transmits the setting data, transmitted from the server 40 through the process bus 50, to the communication port 102c.

As described above, in the substation instrument control system 3, the transformer 10A includes the LPFs 101a and 102a that are formed by the programmable amplifiers or the analog FPGAs, and the settings of the LPFs 101a and 102a can be changed based on the setting data transmitted from the server 40. Other aspects of instrument control system 2 are similar to instrument control system 1.

As would be appreciated by those of ordinary skill in the art, with the benefit of this disclosure, the present disclosure is not limited to the above-described embodiments, but various modifications can be made without departing from the scope of the disclosure. For example, in one embodiment, the server 40 may be connected to the process bus 50 through the IED 30. Alternatively, the server 40 may be directly connected to the process bus 50. The IED 30 may include a user interface having a display device such as a monitor and an input device such as a keyboard and a mouse, and a user may set the setting data.

As shown in FIGS. 1, 2, and 4, in one embodiment, the different system components (e.g., transformer(s), merging unit(s), IED(s) and server(s)) may be communicatively coupled through wired or wireless networks to facilitate transmission of signals between components. Such systems are well known to those of ordinary skill in the art and will therefore not be discussed in detail herein.

What is claimed is:

1. A substation instrument control system comprising:
a plurality of transformers;
wherein the plurality of transformers generate a plurality of waveform signals representing electric properties of a substation instrument main body;
a merging unit communicatively coupled to the plurality of transformers comprising a signal processing unit and a control unit;
wherein the signal processing unit receives the plurality of waveform signals from the plurality of transformers;
wherein the signal processing unit converts the plurality of waveform signals to a digital signal;
wherein the control unit controls operation of the signal processing unit using a setting data;
an intelligent electronic device communicatively coupled to the merging unit;
wherein the intelligent electronic device receives the digital signal from the merging unit;
a memory, wherein the memory stores setting data;
a clock generating circuit, wherein the dock generating circuit controls at least one of a switching timing of a multiplexer in the signal processing unit and a sampling timing of an A/D converter in the signal processing unit; and
a communication port, wherein the communication port at least one of transmits the digital signal from the merging unit to the intelligent electronic device and transmits setting data from the intelligent electronic device to the control unit.

2. The system of claim 1, wherein a process bus communicatively couples the intelligent electronic device to the communication port.

3. The system of claim 1, wherein the intelligent electronic device receives setting data from a server.

4. The system of claim 1, wherein the intelligent electronic device further comprises a user interface, wherein a user may input setting data using the user interface.

5. The system of claim 1, wherein the setting data may include at least one of a clock frequency of a clock generating circuit; a characteristic of a filter in the signal processing unit; a sampling rate of an A/D converter in the signal processing unit; a function number used to identify a digital filter in the signal processing unit; an input type of the signal processing unit and a rated value of the signal processing unit.

6. The system of claim 1, wherein the signal processing unit comprises:
a plurality of low-pass filters;
wherein the plurality of low-pass filters pass a low-frequency band of the plurality of waveform signals received from the plurality of transformers;
a multiplexer;
wherein the multiplexer sequentially inputs the plurality of waveform signals from the plurality of low-pass filters and generates an analog waveform signal; and
an A/D converter;
wherein the A/D converter converts the analog waveform signal to the digital signal.

7. The system of claim 1, wherein the signal processing unit comprises:
a low-pass filter;
wherein the low-pass filter passes a low-frequency band of one of the plurality of waveform signals received from the plurality of transformers;
a modulator;
wherein the modulator converts the low frequency band of one of the plurality of waveform signals passed through the low pass filter to a corresponding digital signal; and
a digital filter;
wherein the digital filter substantially removes a quantization noise of the corresponding digital signal.

8. The system of claim 7, wherein the control unit adjusts the digital filter based on setting data.

9. A substation instrument control system comprising:
a first transformer, wherein the first transformer comprises:
a first filter for filtering a first waveform signal reflecting an electric characteristic of a substation instrument main body;
a first converter for converting the first waveform signal to a first digital signal,
a first communication port, wherein the first communication port transmits the first digital signal and receives a first setting data;
wherein a filter characteristic of the first filter is set by the first setting data; and
a merging unit;
wherein the merging unit receives the first digital signal from the first communication port;

a first communication port,
   wherein the first communication port communicates with a communication port of the merging unit;
a second communication port;
   wherein the second communication port communicates with a server; and
an intelligent electronic device unit, wherein the intelligent electronic device unit controls operation of the first communication port and the second communication port.

10. The system of claim 9, wherein the communication port receives the setting data from one of the merging unit, a server, and an intelligent electronic device.

11. The system of claim 9, wherein the merging unit at least one of transmits the first digital signal to an intelligent electronic device and receives setting data from at least one of the intelligent electronic device and a server.

12. The substation instrument control system of claim 9, further comprising:
   a second transformer, wherein the second transformer comprises:
      a second filter for filtering a second waveform signal reflecting an electric characteristic of a substation instrument main body;
      a second converter for converting the second waveform signal to a second digital signal,
      a second communication port, wherein the second communication port transmits the second digital signal and receives a second setting data;
         wherein a filter characteristic of the second filter is set by the second setting data; and
      wherein the merging unit receives the second digital signal from the second communication port.

13. A method for controlling a substation instrument main body comprising the steps of:
   obtaining a plurality of waveform signals reflecting an electric property of a substation instrument main body;
      wherein a plurality of transformers obtain the plurality of waveform signals;
   transmitting the plurality of waveform signals to a merging unit;
      wherein the merging unit comprises a signal processing unit, a control unit and a communication port;
   converting the plurality of waveform signals to a digital signal using the signal processing unit;
   directing the digital signal to an intelligent electronic device through the communication port;
   inputting a setting data of at least one of the plurality of transformers and the merging unit;
   directing the setting data of at least one of the plurality of transformers and the merging unit to the communication port;
   adjusting a characteristic of at least one of the signal processing unit and the plurality of transformers using the setting data;
   a plurality of low-pass filters;
      wherein the plurality of low-pass filters pass a low-frequency band of the plurality of waveform signals received from the plurality of transformers;
   a multiplexer;
      wherein the multiplexer sequentially inputs the plurality of waveform signals from the plurality of low-pass filters and generates an analog waveform signal; and
   an A/D converter;
      wherein the A/D converter converts the analog waveform signal to the digital signal.

14. The method of claim 13, wherein the waveform signal comprises one of a current signal and a voltage signal.

15. The method of claim 13, wherein the setting data is directed to the at least one of the plurality of transformers and the merging unit by at least one of a server and the intelligent electronic device.

16. The method of claim 13, wherein the merging unit is communicatively coupled to the intelligent electronic device through a process bus.

17. The method of claim 13, wherein the signal processing unit comprises:
   a low-pass filter;
      wherein the low-pass filter passes a low-frequency band of one of the plurality of waveform signals received from the plurality of transformers;
   a modulator;
      wherein the modulator converts the low frequency band of one of the plurality of waveform signals passed through the low pass filter to a corresponding digital signal;
   a digital filter;
      wherein the digital filter substantially removes a quantization noise of the corresponding digital signal.

* * * * *